US008234951B1

(12) United States Patent
Muñoz et al.

(10) Patent No.: US 8,234,951 B1
(45) Date of Patent: Aug. 7, 2012

(54) BISTABLE AERIAL PLATFORM

(75) Inventors: Aaron A. Muñoz, Dover, FL (US); Craig P. Lusk, Lutz, FL (US)

(73) Assignee: University of South Florida, Tampa, FL (US)

( * ) Notice: Subject to any disclaimer, the term of this patent is extended or adjusted under 35 U.S.C. 154(b) by 282 days.

(21) Appl. No.: 12/779,570

(22) Filed: May 13, 2010

Related U.S. Application Data

(60) Provisional application No. 61/177,813, filed on May 13, 2009.

(51) Int. Cl.
*G05G 11/00* (2006.01)
*H01H 57/00* (2006.01)
*H02N 10/00* (2006.01)

(52) U.S. Cl. ...................... 74/490.09; 200/181; 310/306

(58) Field of Classification Search ............... 74/490.08, 74/490.09; 200/181; 310/306, 307, 309; 60/528

See application file for complete search history.

(56) References Cited

U.S. PATENT DOCUMENTS 6,360,539 B1 * 3/2002 Hill et al. ........................ 60/528
6,367,252 B1 * 4/2002 Hill et al. ........................ 60/528
7,019,434 B2 * 3/2006 Helmbrecht .................. 310/309
7,075,209 B2 7/2006 Howell et al.
7,126,446 B2 10/2006 Howell et al.
7,339,715 B2 3/2008 Webber et al.
2003/0029705 A1 * 2/2003 Qiu et al. ...................... 200/181
2005/0127588 A1 6/2005 Gatzen
2007/0023271 A1 2/2007 Lusk et al.
2007/0028714 A1 2/2007 Lusk et al.
2009/0261688 A1 * 10/2009 Xie et al. ...................... 310/307

OTHER PUBLICATIONS

Munoz, Developments Toward a Micro Bistable Aerial Platform: Analysis of the Quadrantal Bistable Mechanism, M.S. Thesis, University of South Florida, Oct. 2008.

Munoz and Lusk, Developments Toward a Micro Bistable Aerial Platform: Analysis of the Quadrantal Bistable Mechanism, Proceedings of the 2009 ASME International Design Engineering Technical Conferences and Computers and Information in Engineering Conference, Aug. 30-Sep. 2, 2009, San Diego, CA, DETC2009-87412.

Baker, On-Chip Actuation of Compliant Bistable Micro-Mechanisms, M.S. Thesis, Brigham Young University, Apr. 2002.

Lusk, Ortho-Planar Mechanisms for Microelectromechanical Systems, Ph.D. Dissertation, Brigham Young University, Aug. 2005.

* cited by examiner

*Primary Examiner* — Justin Krause

(74) *Attorney, Agent, or Firm* — Jeremy Spier; Anton J. Hopen; Smith & Hopen, P.A.

(57) ABSTRACT

A bistable MEMS platform. The bistable MEMS platform converts a rotational input into an ortho-planar displacement and can maintain either it's up or down position without an input force due to bi-stability. The bistable MEMS platform generally includes three components. The first component is a pair of quadrantal bistable mechanisms (QBM). The second is a compliant version of a micro helico-kinematic platform (HKP) that serves to coordinate the motion of the QBM. The third component is an aerial platform, which is a variation of a scissor lift mechanism that attaches to the output of the QBM and amplifies the out-of-plane displacement.

5 Claims, 10 Drawing Sheets

BISTABLE AERIAL PLATFORM

CROSS-REFERENCE TO RELATED APPLICATION

This application claims priority to U.S. Provisional Patent Application No. 61/177,813, entitled “BISTABLE AERIAL PLATFORM”, filed on May 13, 2009, the contents of which are hereby incorporated by reference.

FIELD OF THE INVENTION

This invention relates to micro-electromechanical systems (MEMS) devices. More specifically, this invention relates to a bistable MEMS platform.

BACKGROUND OF THE INVENTION

Compliant mechanisms are devices that gain their mobility from elastic deformation rather than the rigid-body motions of conventional mechanisms. Unlike traditional rigid-link mechanisms where elastic deformation is detrimental to performance, a compliant mechanism is designed to take advantage of the flexibility of the material. The function of the compliant member within a compliant mechanism can be as basic as serving as a simple spring or as complex as generating a specified motion.

At the micro scale, compliant mechanisms are important because frictional forces encountered in conventional rigid joints dominate the inertial forces at the micro level, thus making the use of rigid-link mechanisms inappropriate for micro applications. Because friction in the micro scale discourages the use of gears and joints due to excessive energy loss, the obvious alternative choice is compliant mechanisms since they do not suffer frictional losses. Compliance is of particular importance to the further development of MEMS because compliant mechanisms reduce part counts when compared with rigid-body mechanisms that produce the same function, thus enabling further miniaturization.

Compliant mechanisms are well suited for MEMS applications because their joint-less, single-piece construction is unaffected by many of the difficulties associated with MEMS, such as wear, friction, inaccuracies due to backlash, noise, and clearance problems associated with the pin joints. In addition, many compliant mechanisms are planar in nature, do not require assembly, and can be made using a single layer. This greatly enhances the manufacturability of micro-mechanisms because MEMS are planar and are typically built in batch production with minimal or no assembly.

A compliant system is considered to be stable, and at a potential energy minimum, if a small external disturbance only causes it to oscillate about an equilibrium position. An equilibrium position is unstable, a potential energy maximum, if a small disturbance causes the system to move to another position. Typical compliant mechanisms have only one stable state, and require a sustained force in order to hold a second state. A bistable mechanism, on the other hand, is capable of holding one of two stable states at any given time, and consumes energy only during the motion from one stable state to the other. This bistable behavior is achieved by storing energy during part of its motion, and then releasing it as the mechanism moves toward a second stable state. Because flexible segments store energy as they deflect, compliant mechanisms can be designed to use the same segments to gain both motion and a second stable state, which can result in a significant reduction in part count.

In MEMS as well as in other applications, there exists a large need for bistable devices, or devices that can be selectively disposed in either of two different, stable configurations. Bistable devices can be used in a number of different mechanisms, including switches, valves, clasps, and closures. Switches, for example, often have two separate states: on and off. However, most conventional switches are constructed of rigid elements that are connected by hinges, and therefore do not obtain the benefits of compliant technology. Compliant bistable mechanisms have particular utility in a MEMS environment, in which electrical and/or mechanical switching at a microscopic level is desirable, and in which conventional methods used to assemble rigid body structures are ineffective

SUMMARY OF INVENTION

The invention, called the Bistable Aerial Platform (BAP), includes a compliant mechanism that converts a rotational input into a large ortho-planar displacement of a platform with two stable equilibrium positions, up and down.

In one of many possible embodiments, an exemplary system is formed from the combination of compliant mechanisms (the quadrantal bistable mechanism and the helico-kinematic platform) as well as an additional rigid-body mechanism (the bistable platform). The quadrantal bistable mechanism includes a planar link, an ortho-planar link, and a quadrantal link. The planar link is pivotally connected to the ortho-planar link and both the planar and ortho-planar links are connected to the quadrantal link forming an arc that is approximately a quarter circle. Two quadrantal bistable mechanisms are then positioned 180 degree opposite each other and connected at a center point. The helico-kinematic platform includes an annulus and two beams affixed to the annulus at opposing points. The first ends of the beams are adapted to receive a force and the opposing ends are affixed to the planar links of the quadrantal bistable mechanisms at opposite and opposing locations. The ortho-planar links rest on top of the annulus and share a center point with the annulus’s center. The bistable platform includes a pair of transversing links and an aerial platform. The first ends of the transversing links are attached to opposing ortho-planar links and the second ends of the transversing links are attached to the aerial platform at opposing points.

The invention functions as a switch in that its aerial platform can lock in two positions, up or down. When force is applied to the beams, the beams buckle upward and lift the annulus of the helico-kinematic platform. The rising of the annulus lifts the ortho-planar links from a first stable position to a second stable position of 90 degrees. The rising of the ortho-planar links actuates the transversing links of the bistable platform which raises the aerial platform to a second stable position.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

The invention of a preferred embodiment, hereinafter referred to as the bistable aerial platform (BAP), is generally comprised of three components. The first component is a pair of quadrantal bistable mechanisms (QBM). The second is a compliant version of a micro helico-kinematic platform (HKP) that serves to coordinate the motion of the QBM. The third component is an aerial platform, which is a variation of a scissor lift mechanism that attaches to the output of the QBM and amplifies the out-of-plane displacement.

Figure 1:
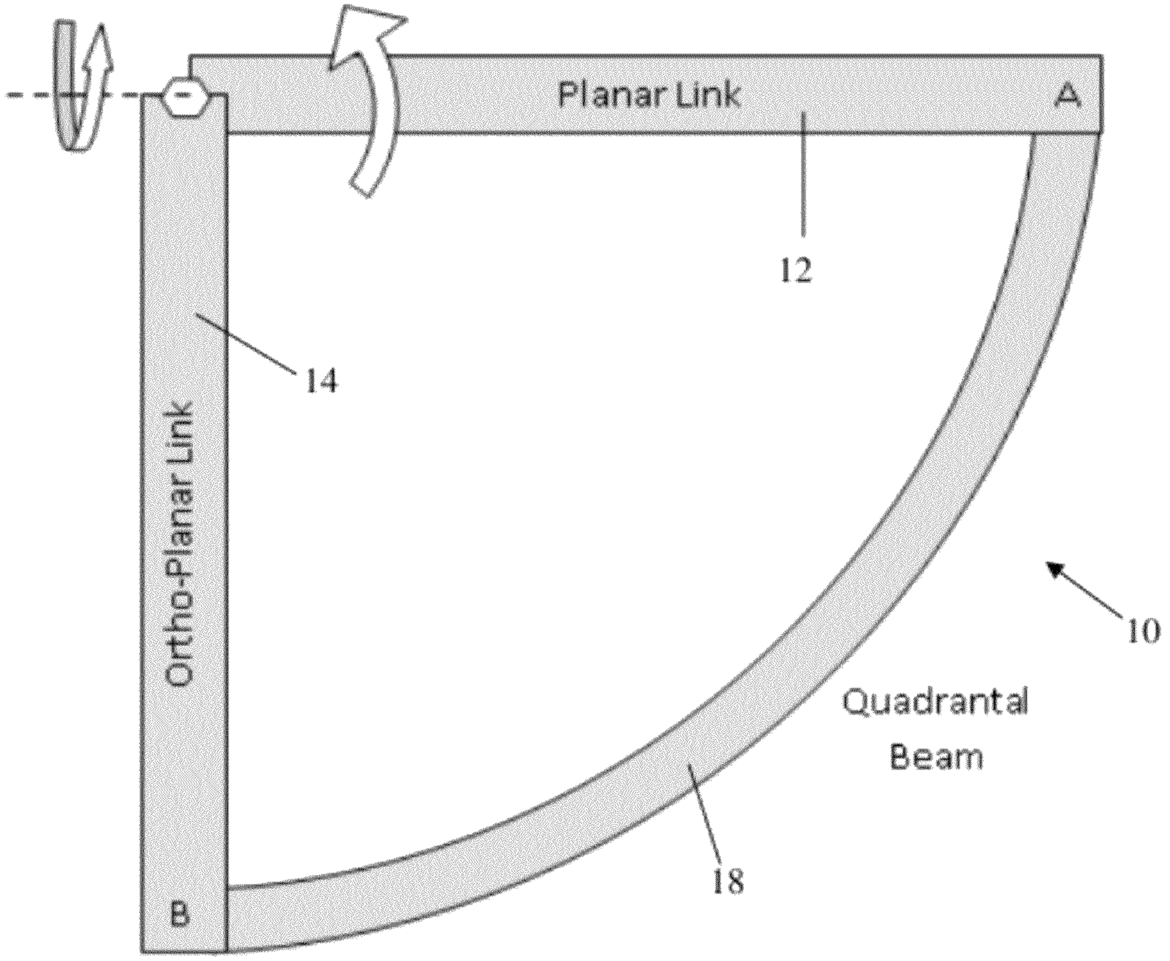
FIG. 1 is a top view of the Quadrantal Bistable Mechanism.
Figure 2:
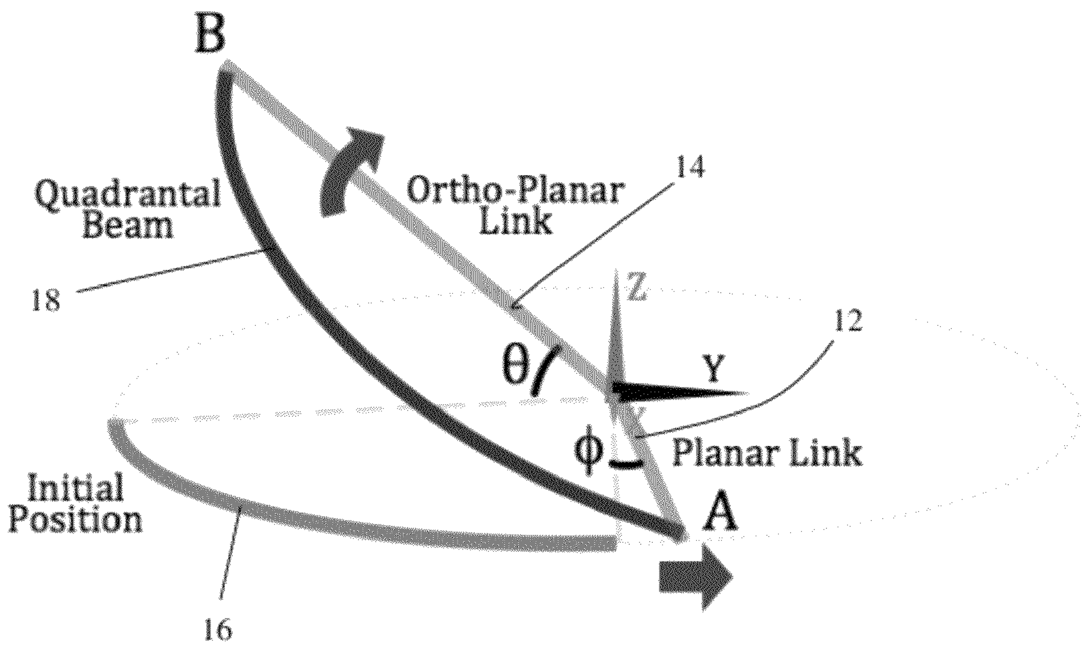
FIG. 2 is a side view of the Quadrantal Bistable Mechanism.

As shown in FIGS. 1 and 2, the QBM (10) includes two links, the planar and ortho-planar, that rotate about intersecting, orthogonal axes. The rotation of the planar link (12) is in-plane while the ortho-planar link (14) rotates out-of-plane. The axes of rotation of the planar and ortho-planar links are called the planar axis and ortho-planar axis, respectively. In the QBM's initial position (16), the links are perpendicular to each other and lie in (or near) a common base plane. A thin, compliant beam, the quadrantal beam (18), connects the two links and forms an arc that is approximately a quarter circle (or quadrant).

Figure 3:
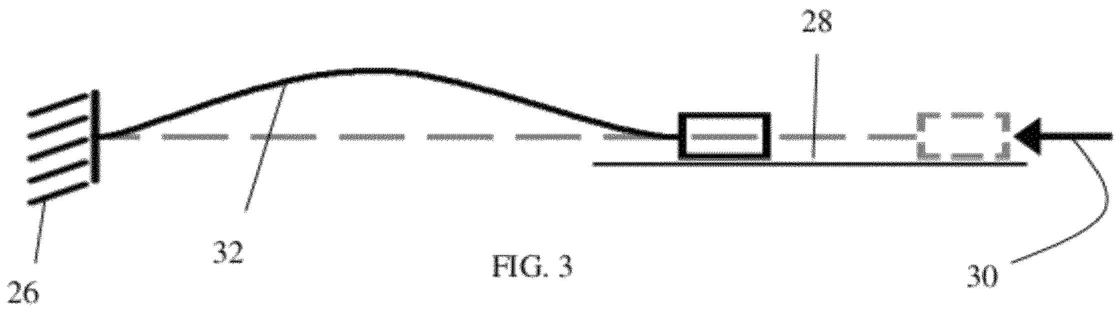
FIG. 3 is a linear beam buckled under a compressive load.

There are two potential input links for the QBM; the planar and the ortho-planar links may be used either individually or simultaneously. In any case, the mechanism can move from its initial first stable position to its second stable position, which occurs as the ortho-planar link reaches ninety degrees of rotation, i.e., θ equals ninety degrees in FIG. 2. In the described device, the ortho-planar link is the input, i.e., the mechanism is actuated using the ortho-planar link. This is partly because a relatively large force, the planar threshold force, is required to actuate the mechanism using the planar link. The benefit of actuating the device in this manner is that with only a few degrees of input rotation, the ortho-planar link is drawn through a full ninety degrees into its second stable position. Fortunately, providing a bias to the mechanism by first raising the ortho-planar link greatly reduces the planar threshold force. The higher the ortho-planar link is raised, the less force is needed to rotate the planar link In FIGS. 3-5, the compliant helico-kinematic platform (HKP) (20) is a spherical mechanism in which a platform (22) is raised out-of-plane by the coordinated buckling of beams. As shown in FIG. 3, a long, thin beam (32) is fixed at one end (26) and has the motion of its other end limited by a longitudinal slide (28). The beam (32) buckles and its center rises when a compressive force (30) is applied.

Figure 4:
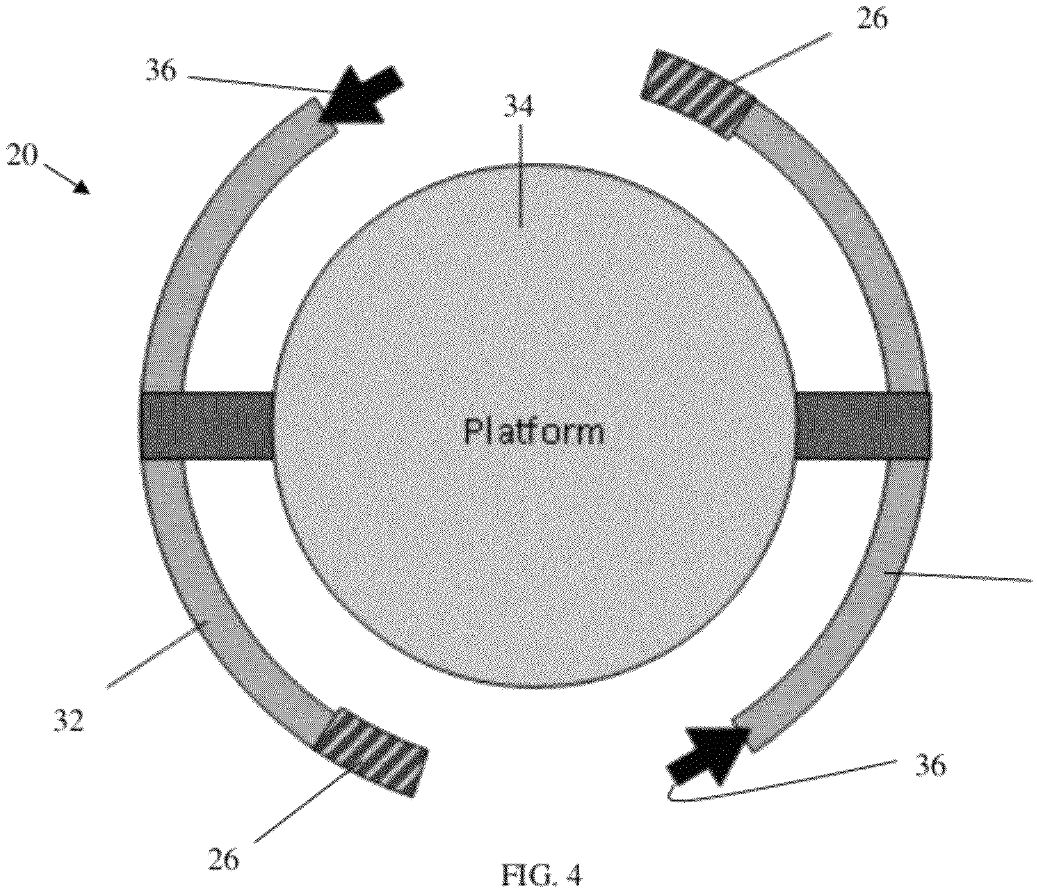
FIG. 4 is a top view of the Helico-Kinematic Platform.
Figure 5:
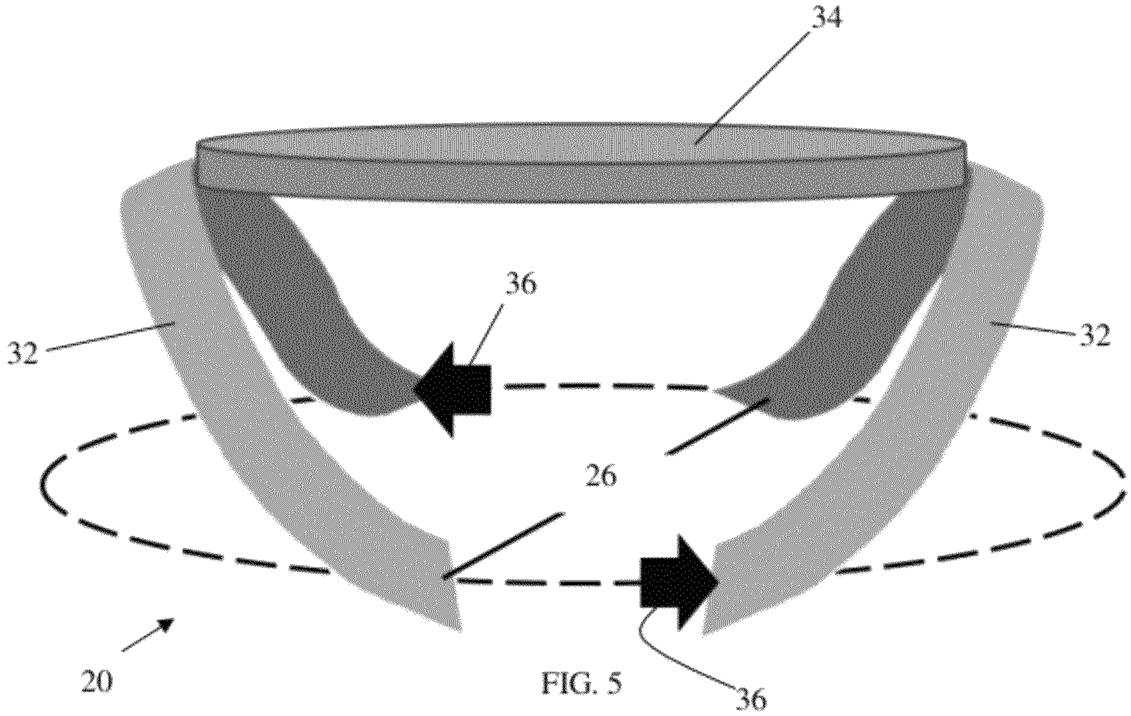
FIG. 5 is a side view of the actuated Helico-Kinematic Platform.

As show in FIGS. 4 and 5, by taking two or more of these beams (32) and attaching a common platform (34) at their centers, their displacements will be constrained such that the beams will only buckle out-of-plane, thus raising the platform. Curving these beams (32) around a circular platform (34) will allow them to be simultaneously actuated by a single rotary input (36). When buckled, these beams support the HKP like the legs of a table.

Figure 6:
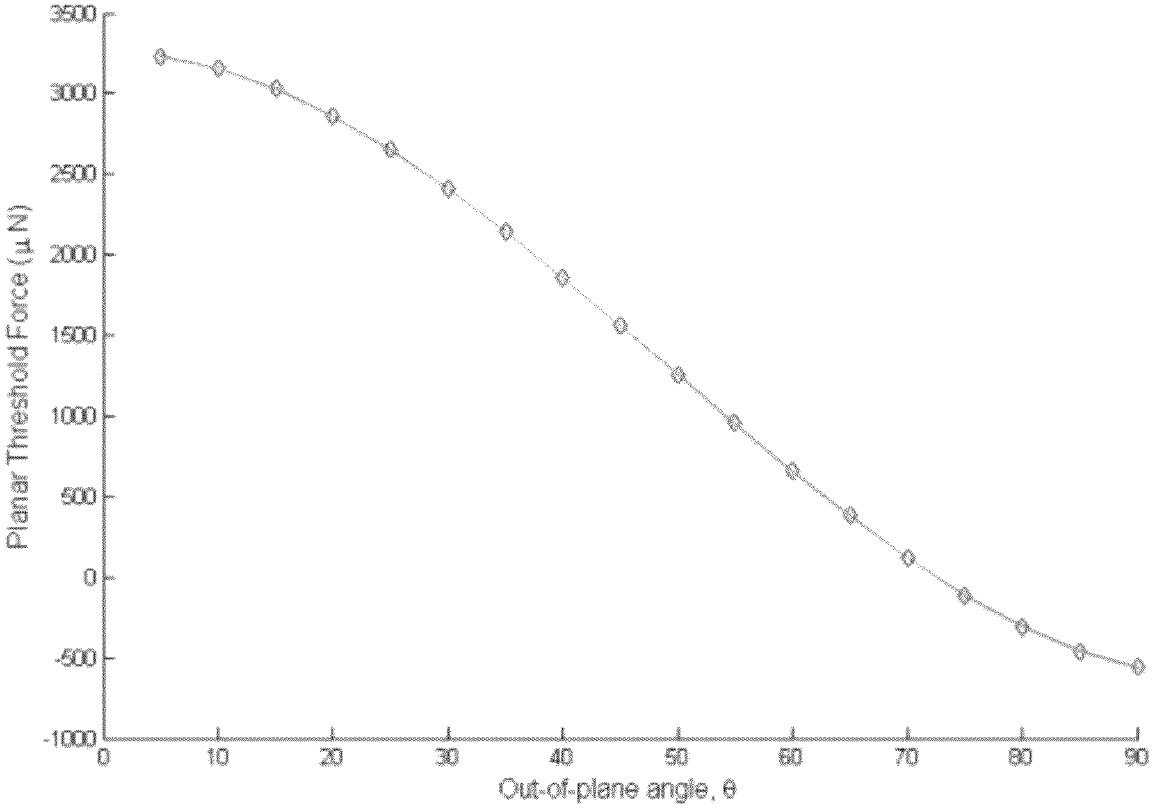
FIG. 6 is a graph illustrating planar threshold force vs. θ.

The BAP resulted from analysis of the QBM. A decreasing planar threshold force was obtained by biasing the ortho-planar link with an initial ortho-planar displacement, as shown in FIG. 6.

Figure 7:
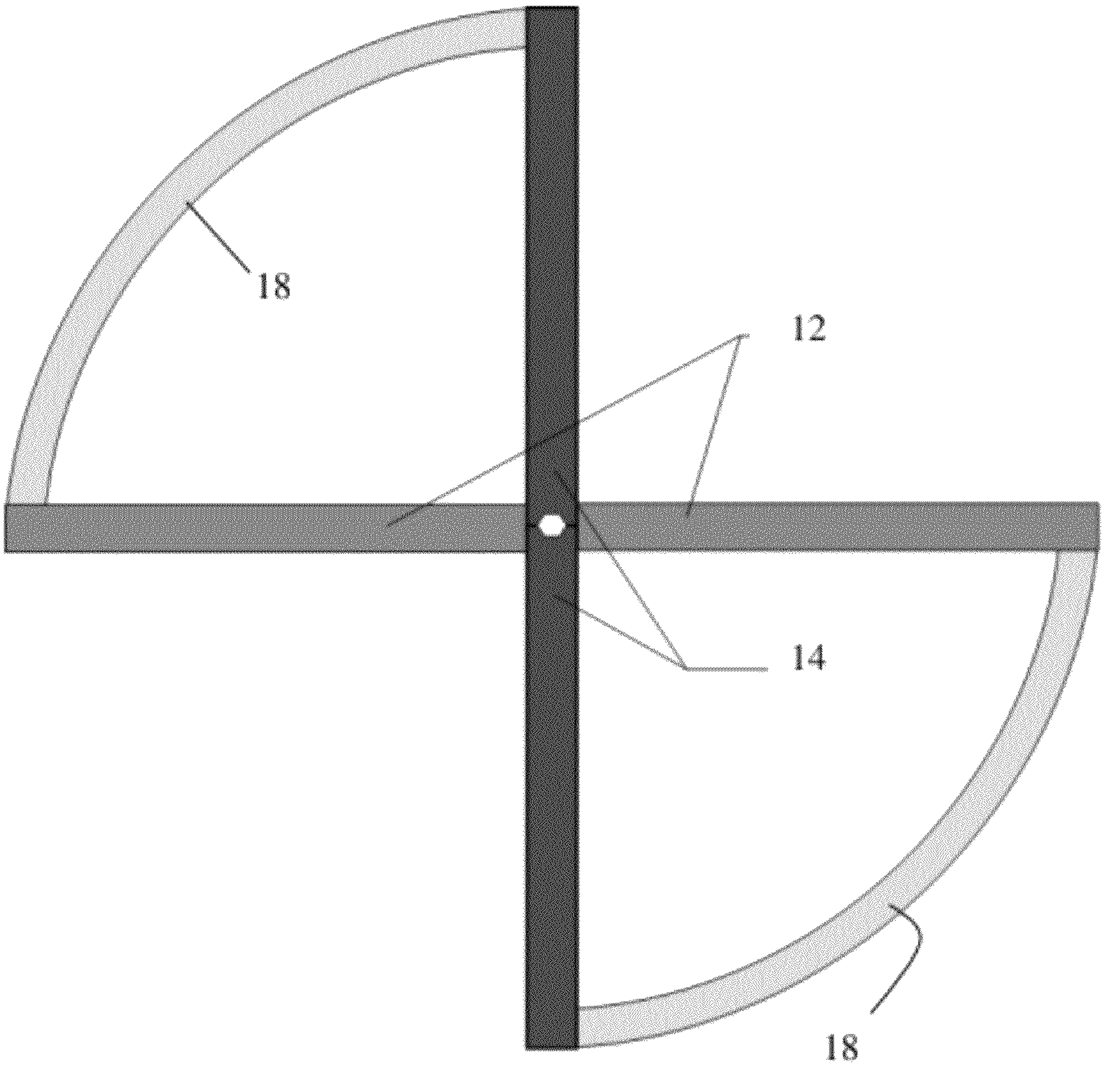
FIG. 7 is a conjoined Quadrantal Bistable Mechanism Pair.

As shown in FIG. 7, two QBMs are merged into a unified mechanism that share the same base plane, planar axis, ortho-planar axis, and center point. To achieve this, one QBM is rotated by one hundred eighty degrees with respect to the other about their common planar axis. With the planar links (12) further conjoined, only a single rotary input is needed to simultaneously actuate both QBMs.

Figure 8:
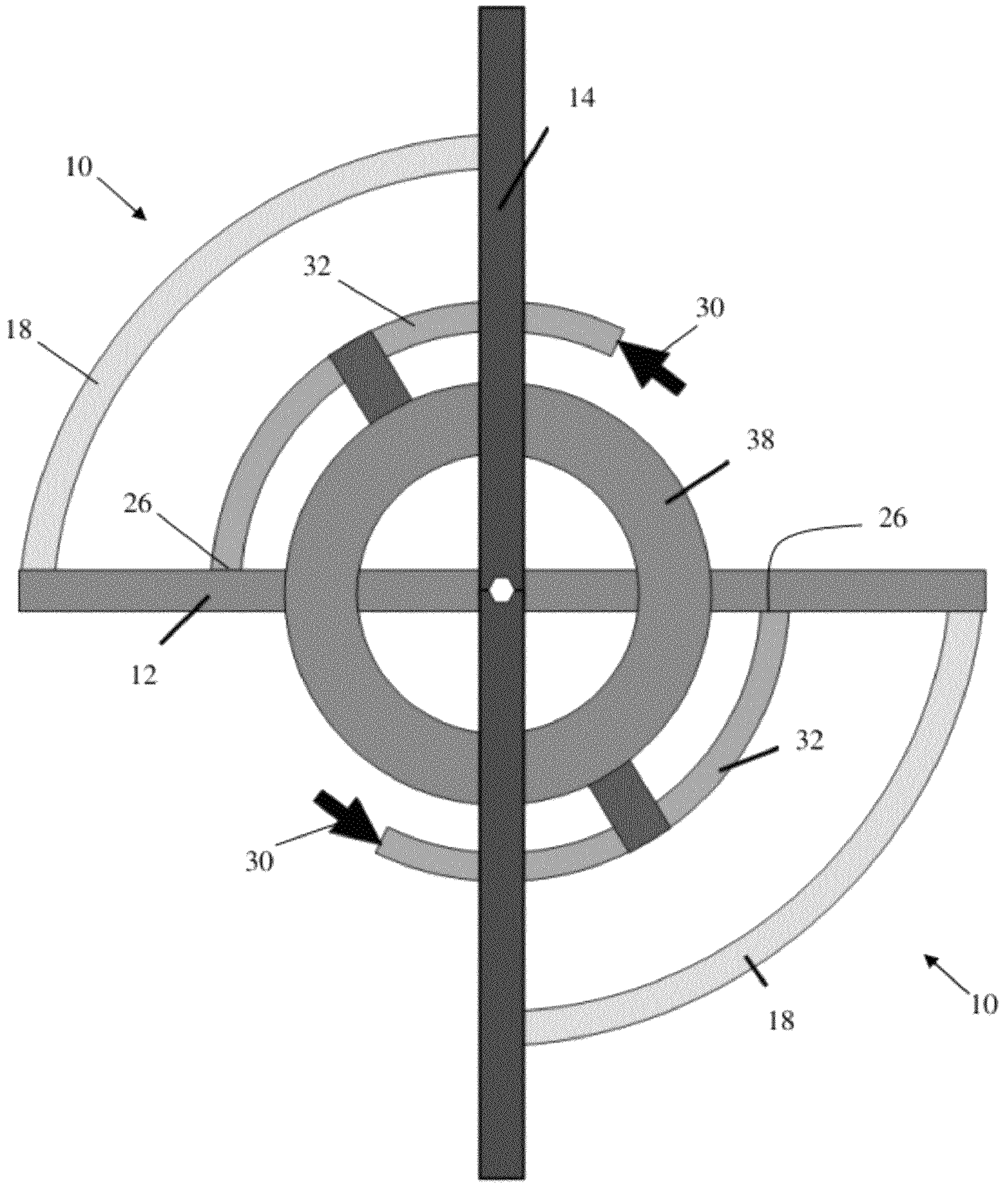
FIG. 8 shows the integrated compliant components of the Bistable Aerial Platform.

As shown in FIG. 8, a coordinated input to both QBMs (10) is accomplished through the use of a compliant HKP (20). Because the beams (32) of the compliant HKP must be compressed in order to buckle, one way to accomplish this is for one end to be fixed (26) while a compressive force (30) is applied to the other end. Because the QBM when actuated by rotating the planar link (12) and without an out-of-plane bias of the ortho-planar link (14) requires a very large planar threshold force to initiate movement, the QBM's planar links (12) are virtually fixed (26) until the planar threshold force is reached, thereby allowing the attachment of the fixed (26) end of a HKP beam to the QBM's planar link (12), as shown in FIG. 8.

Figure 9:
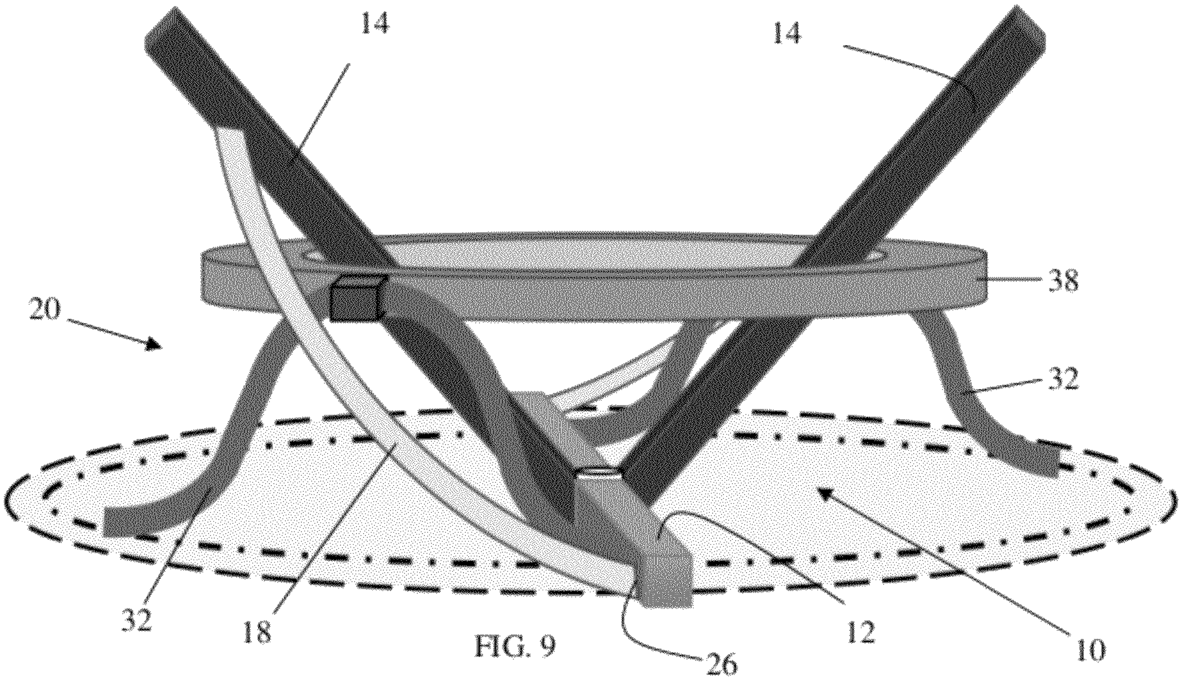
FIG. 9 shows the elevating ring lifting the ortho-planar links.

In the BAP, the HKP acts as a transmission to provide input forces to the two QBMs. The mechanism can simultaneously provide the planar threshold force and raise the ortho-planar links to give the needed bias. This is accomplished by situating the HKP (20), a spherical mechanism requiring rotary input, concentric with the QBMs (10), as shown in FIG. 9. The HKP's (20) platform is cut to form an annulus (38) and designated as the elevating ring. From this location, the elevating ring (38) can concurrently raise the ortho-planar links (14) of both QBMs (10) in order to reduce the planar threshold force. Thus, when the HKP (20) is rotated, its compliant beams (32) are compressed by the fixed planar links (12) and therefore buckle. This forces the elevating ring (38) to rise and lift the QBMs' ortho-planar links (14), as shown in FIG. 9. The elevating ring (38) and ortho-planar links (14) rise until the planar threshold force equals the force required to buckle the beams. When this occurs, the QBMs' planar links (12) rotate causing the ortho-planar links (14) to be drawn upright and the elevating ring (38) to collapse as its beams (32) straighten due to the withdrawal of the compressive force needed to maintain it in the raised position.

When the QBMs' links are upright (i.e., θ equals ninety degrees as shown in FIG. 2) the QBMs are in their second stable position. Thus, the BAP is in its second stable position requiring no additional forces to maintain itself. Because this position is stable, the QBM's ortho-planar links will resist forces smaller than the ortho-planar threshold force. As was the case for the planar threshold force, the magnitude of the ortho-planar threshold force depends on the position of the QBM's planar link The compliant HKP again proves ideal because it can also pull the BAP out of its second stable position. A reversal in the direction of the input forces (30) on the HKP will put the beams under tension and pull the attached planar links of the QBMs. Once the planar links reach their initial positions, the ortho-planar links simply fall back down. Throughout this deactivation, the elevating ring will remain down.

Figure 10:
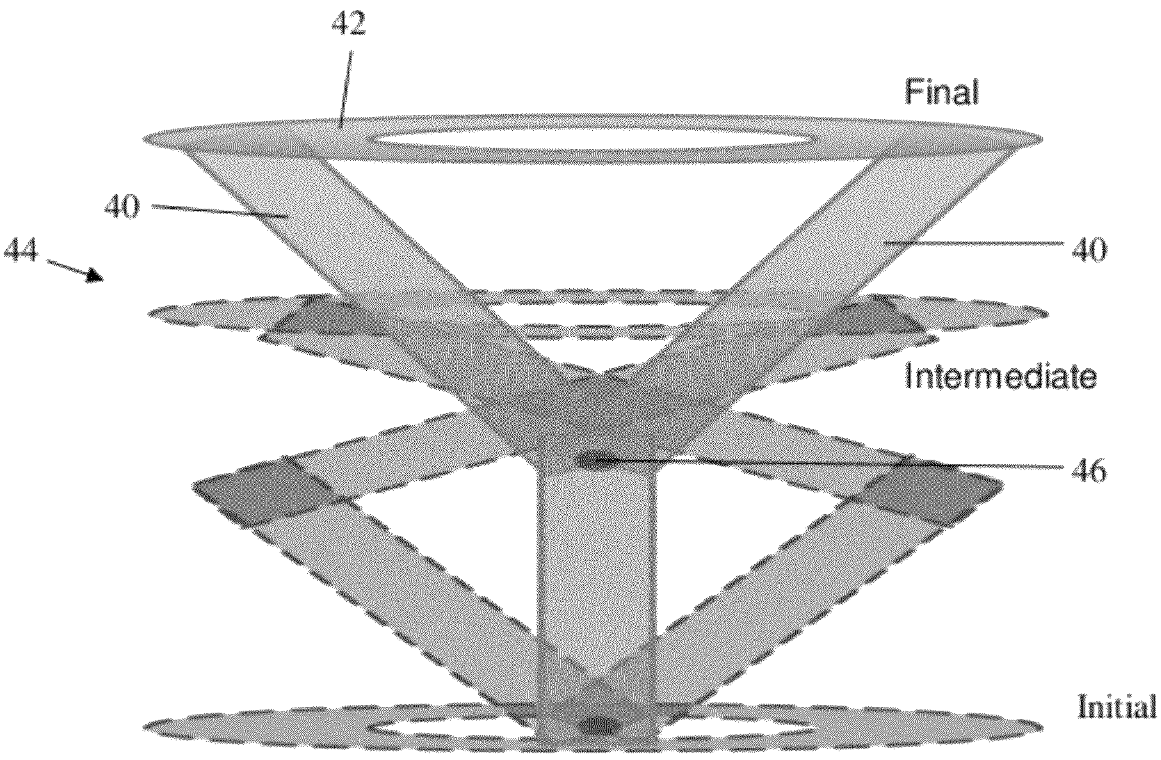
FIG. 10 is a side view of the Bistable Aerial Platform platform in its initial, intermediate, & final positions.

The bistable mechanism of the BAP and its method of input coordination have been described; all that remains is to attach the aerial platform. Note, the elevating ring (38) of the compliant HKP is not bistable nor does it lock in the up position. The bistable platform (44) of the BAP is a separate, additional platform that is connected to the ends of the two ortho-planar links (14), as they are the only links that lock in the second stable position. As illustrated in FIG. 9, as the BAP actuates, the ortho-planar links (14) of the QBM pair form a V-shape whose interior angle becomes increasingly more acute. This provides the required input motion for a scissor-lift mechanism, as shown in FIG. 10. The transversing links (40) are joined at their ends by means of a large aerial platform (42) to serve as a platform. In the shown embodiment, the aerial platform is a ring. Connected in this manner, the transversing links (40) now have a shifting pivot point (46) that allows them to conform to a platform rather than coming together at the center, as shown in FIG. 10.

Figure 11:
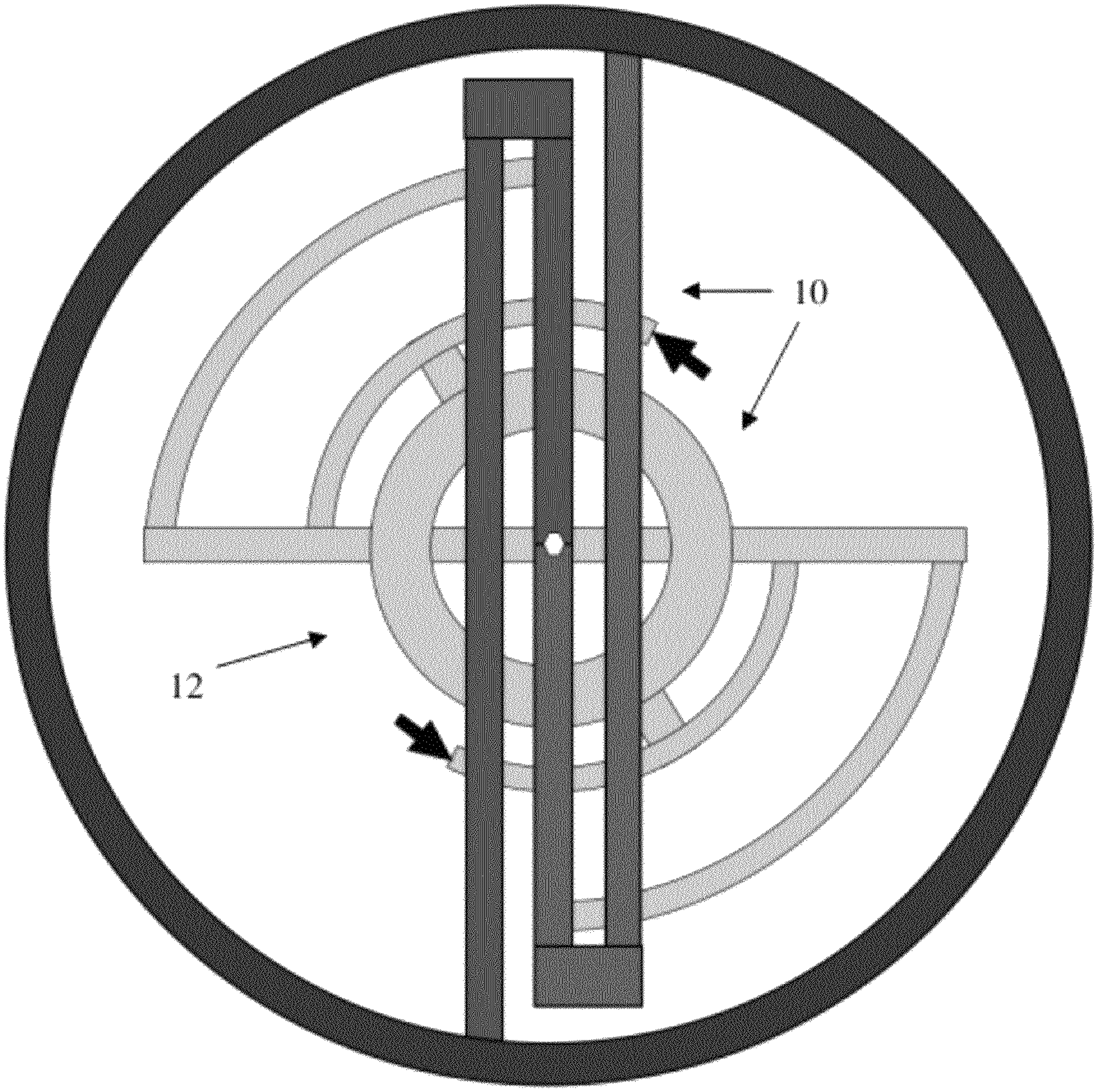
FIG. 11 is a top view of the complete Bistable Aerial Platform mechanism showing the attached aerial platform ring.

FIG. 11 illustrates a preferred embodiment of the assembled BAP, including the QBMs (10), HKP (20), and bistable platform (44).

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

What is claimed is:

1. A bistable MEMS platform, comprising:

a pair of quadrantal bistable mechanisms, each quadrantal bistable mechanism, comprising:

a planar link having a first and second end;

an ortho-planar link having a first and second end, said first end of said ortho-planar link being pivotally connected to said first end of said planar link; and a quadrantal link having a first and second end, said first end of said quadrantal link being connected to said second end of said planar link, said second end of said quadrantal link being connected to said second end of said ortho-planar link;

said pair of quadrantal bistable mechanisms being positioned 180 degrees opposite each other and connected at a center point;

a helico-kinematic platform, comprising an annulus;

a first beam having a first and second end, said first beam being affixed to said annulus at points between said first and second ends of said first beam, said first end of said first beam being adapted to receive a force, said second end of said first beam being affixed to said planar link; and a second beam having a first and second end, said second beam being affixed to said annulus at points between said first and second ends of said second beam, said first end of said second beam being adapted to receive a force, said second end of said second beam being affixed to said planar link;

a bistable platform, comprising an aerial platform; and a pair of transversing links each having a first and second end, said first ends of said transversing points being attached to said second ends of said ortho-planar links at opposite sides, said second ends of said transversing links being attached to said aerial platform at opposite points.

2. A bistable MEMS platform as in claim 1, further comprising:

said quadrantal link of said quadrantal bistable mechanism being a thin, arched compliant beam.

3. A bistable MEMS platform as in claim 1, wherein said connected pair of quadrantal bistable mechanisms share a base plane, planar axis, ortho-planar axis, and center point.

4. A bistable MEMS platform as in claim 1, further comprising:

an actuating force applied to said first ends of said beams of said helico-kinematic platform.

5. A bistable MEMS platform as in claim 1, further comprising:

said aerial platform being a ring.

* * * * *